United States Patent Office 3,394,238
Patented July 23, 1968

3,394,238
PROCESS OF ELECTRIC ARC WELDING
AND COMPOSITION
Wayne L. Wilcox, Havertown, Pa., assignor to Arcos Corporation, Philadelphia, Pa., a corporation of Pennsylvania
No Drawing. Filed Sept. 4, 1964, Ser. No. 394,616
11 Claims. (Cl. 219—73)

ABSTRACT OF THE DISCLOSURE

The invention relates to a process and to a combined electrode and flux coating for producing tough welds of steel at as-welded yield strengths in excess of 115,000 p.s.i. or 130,000 p.s.i. as the case may be, including a closely controlled flux composition, a closely controlled composition of electrode wire, in some cases a composition of the steel work, baking the flux at a controlled temperature and protecting the flux and electrode against moisture after baking, preheating the steel work within a particular temperature range and electric arcing between electrode wire coated with the flux and the work, the weld metal containing between 2 and 5% of nickel. Post heating of the work and weld metal are also contemplated.

DESCRIPTION OF INVENTION

Restriction has been required in the present case, and the subject matter relating to the use of a flux-cored electrode is embodied in a divisional application, Ser. No. 691,146, filed Dec. 18, 1967, for Process of Electric Arc Welding.

The present invention relates to processes of producing steel welds which combine unusual toughness with high yield strengths, and to electrodes and fluxes therefor.

A purpose of the invention is to obtain a greater margin of safety against brittle failure and a greater toughness and higher yield strength in welds of low alloy steel.

A further purpose is to produce tough steel weld metal having a yield strength in excess of 115,000 p.s.i., preferably in excess of 130,000 p.s.i., and in many instances in excess of 140,000 p.s.i.

A further purpose is to minimize weld cracking in welding steel of high strength.

A further purpose is to minimize the formation of cracks in the heat affected zone in welding steel of high strength.

A further purpose is to apply the principles of the invention to welding with flux coated stick or continuous electrodes, using consumable electric arc welding techniques, or short circuiting arc welding techniques using flux. Shielding gas may be used such as carbon dioxide, argon, helium, or mixtures thereof. It will be understood that where deoxidation conditions are adequate under the particular flux and with a particular electrode wire, the welding may be accomplished in air.

A further purpose is to apply the principles of the invention to downhand welding, vertical welding, and overhead welding, as required.

Further purposes appear in the specification and in the claims.

In the prior art existing electrodes and welding techniques make it possible to produce tough welds in low alloy steels at yield strengths as high as 110,000 p.s.i. When welding at higher strength levels, however, it has proved to be very difficult to secure the required high yield strengths along with adequate toughness particularly as measured by Charpy V-notch impact resistance at low temperatures such as minus 60° F.

One of the important advantages of the present invention is that unusual toughness can be obtained along with as-welded yield strengths in low alloy steels as high as 115,000 p.s.i., in many cases above 130,000 p.s.i. and in some cases as high as 140,000 p.s.i., or even higher. These high strengths have been secured along with Charpy V-notch impact resistance in excess of 25 foot-pounds at minus 60° F. and in excess of 30 foot-pounds at room temperature.

This combination of properties makes the process of the invention unusually valuable for high strength welding, for example in connection with submarine hull construction.

These properties are obtained in welding low alloy weldable steel which itself has comparable properties.

In accordance with the invention a flux is used which, when applied as a coating on the electrode, is a combination of fluorspar, limestone, and titania, with a source of silicon, a source of manganese, and optionally with other ferro-alloys or alloy ingredients.

Both the flux and the electrode wire should be low in moisture content. For this purpose the flux is normally baked at the factory at a temperature of 500 to 1000° F., preferably in the range between 800 and 900° F. As an additional step, the electrode wire and flux may to advantage be baked shortly before use at a temperature of 500 to 1000° F. and protected from moisture subsequent to baking, as for example by carrying it at the elevated temperature to the welding installation. In some cases the electrode and flux will, after baking as previously mentioned, to advantage be held in an oven to protect it from moisture, suitably maintaining it at a temperature of 150° to 300° F. Optionally the flux and the electrode wire may be shipped in a dehumidifying container, for example containing silica gel, to the point of use.

The work is pre-heated to a temperature of 100 to 400° F., preferably 200 to 300° F., prior to welding. Then the welding is conducted under a protecting layer of slag produced by melting the flux. Finally the weld deposited metal and the work are very desirably post-heated at a temperature of 150 to 600° F. and preferably 200 to 300° F. for a time of at least three hours to eliminate hydrogen which may have been picked up during the welding. Very desirably when a temperature in the lower range as for example 150 to 300° F. is used, the time for elimination of hydrogen should be at least six hours.

By this technique, which will be described in more detail, very much higher margins of safety against brittle failure are obtained in welds which are tougher and of higher yield strengths and sound welds free from cracks are more reliably obtained. Yield strengths of 115,000 p.s.i can be reliably obtained and in many cases the yield strengths are as high as 130,000 p.s.i. or even as high as 140,000 p.s.i or even higher, and in any case combined with exceptionally good toughness. The welds are exceptionally free from cracking in the weld deposited metal as well as in the re-heat zone.

BASE METAL

The work is low alloy weldable steels which may be in plate, sheet or any other suitable form. While compositions of other types may be used as later explained, in many cases the composition of the work by weight will be as follows:

|  | Percent |
|---|---|
| Carbon | 0.05–0.50 |
| Sulphur | [1] 0.01 |
| Phosporus | [1] 0.01 |

| | |
|---|---|
| Silicon | [1] 0.5 |
| Manganese | 0.05–1.5 |
| Nickel | 0.5–6 |
| Chromium | 0–2 |
| Molybdenum | 0–1 |
| Columbium | 0–0.5 |
| Vanadium | 0–0.1 |
| Copper | [1] 0.5 |
| Iron | balance |

[1] Maximum.

The following is the composition of a typical heat of one commercial steel of this kind which is known as HP–150 and is sold by Republic Steel Company:

| | Percent |
|---|---|
| Carbon | 0.22 |
| Sulphur | 0.008 |
| Phosphorus | 0.008 |
| Silicon | 0.055 |
| Manganese | 0.12 |
| Nickel | 3.05 |
| Chromium | 1.39 |
| Molybdenum | 0.89 |
| Vanadium | 0.004 |
| Boron | 0.0 |
| Copper | 0.09 |
| Columbium | 0.08 |
| Aluminum | 0.019 |
| Titanium | 0.007 |
| Iron | Balance |

The properties of this steel are typically as follows:

| | |
|---|---|
| Yield strength _____p.s.i. | 150,000 |
| Tensile strength _____p.s.i. | 162,000 |
| Elongation in 2″ _____percent | 19 |
| Reduction in area _____do | 69 |
| The Charpy V-notch impact resistance at 0° F. _____foot-pounds | 94 |
| The Charpy V-notch impact resistance at minus 120° F. _____do | 94 |

Another typical steel of the character in discussion which can be welded according to the invention is known commercially as T-steel and has the following typical analysis in percentage by weight:

| | Percent |
|---|---|
| Carbon | 0.13 |
| Sulphur | 0.025 |
| Phosphorus | 0.021 |
| Silicon | 0.19 |
| Manganese | 0.89 |
| Nickel | 0.82 |
| Chromium | 0.52 |
| Molybdenum | 0.44 |
| Vanadium | 0.034 |
| Boron | 0.003 |
| Copper | 0.25 |
| Iron | Balance |

The heat of steel referred to above was quenched and tempered to obtain the following properties:

| | |
|---|---|
| Yield strength _____p.s.i. | 138,000 |
| Tensile strength _____p.s.i. | 147,750 |
| Elongation in 2″ _____percent | 14 |
| Reduction of area _____do | 42 |

Another typical low alloy weldable steel which may function as base metal in U.S. Steel Corporation HY–150 which has a nominal composition approximately as follows:

| | |
|---|---|
| Carbon | 0.09%. |
| Sulphur | 0.006%. |
| Phosphorus | 0.006%. |
| Silicon | 0.25%. |
| Manganese | 0.75%. |
| Nickel | 5.0%. |
| Chromium | 0.55%. |
| Molybdenum | 0.50%. |
| Vanadium | .07%. |
| Boron | 0. |
| Copper | Residual. |
| Iron | Balance of metallic ingredients. |

The properties are not substantially different from those given above for HP–150.

In many cases the base metal may be a chromium-molybdenum steel of a composition corresponding to the AISI 4100 or AISI 4300 series.

FLUX

The flux employed in welding with covered electrodes according to the present invention has the following composition by weight:

| | |
|---|---|
| Fluorspar | 25 to 35% and preferably about 29%. |
| Limestone | 25 to 50% and preferably about 38%. |
| Titania | 2 to 12% and preferably about 6%. |
| Bentonite | Optionally is included as an extrusion agent ½ to 3½% and preferably about 1%. |
| Ferrosilicon (50% silicon) | 3 to 12% and preferably about 8%. |
| Ferromanganese or manganese | 2 to 15% and preferably about 5%. |
| (The preferred ferromanganese is 78 to 82% manganese and may contain 6 to 7½% carbon.) | |
| Ferrochrome | 0 to 5% and preferably about 2%. |
| Ferromolybdenum | 0 to 3% and preferably about 1%. |
| Nickel | 0 to 20%. |

It will be evident that any other suitable extrusion agent may be used along with or instead of the bentonite.

It should be kept in mind that if carbon is being added with the ferromanganese allowance should be made for this in selecting the carbon content for the electrode wire.

It should be kept in mind that it is important that harmful ingredients such as sulphur, phosphorus and copper should not be introduced as impurities in the fluxing ingredients. A limit of 0.1% (preferably 0.05%) of phosphorus and a similar limit on sulphur is maintained in the nonmetallic ingredients, and in the various alloying ingredients and ferroalloys. The phosphorus limit in high carbon ferromanganese, however, has frequently been 0.3%; hence, we have found it desirable to use electrolytic manganese in many of our experiments.

It should be kept in mind also that the quantity of ferrochrome, ferromolybdenum, ferrocolumbium and ferrovanadium and nickel included in the flux will be adjusted with respect to the quantities in the electrode wire, so as to obtain the desired final quantity in the weld deposited metal.

A binder such as an alkali metal silicate will be used in a range of 5 to 20% of the total weight of the flux. A preferred composition employs three-quarters of the alkali metal silicate as potassium silicate and one-quarter as sodium silicate. The preferred potassium silicate is a concentration of 40.5° Baumé with a ratio of potassium oxide to silica of 1:2.1. The preferred sodium silicate is a concentration of 47° Baumé with a ratio of soda to silica of 1:2.9. The potassium silicate tends to impart arc stability and if potassium silicate is not employed some other arc stabilizer such as a potassium titanate should be used.

The flux and the electrode wire should both be baked initially at a temperature of 500 to 1000° F. and preferably 800 to 900° F. to drive off moisture at the time of manufacture.

It is also important as later explained to protect against picking up moisture after this initial baking.

It will be evident that any fluoride can be used as a source of fluoride providing it does not introduce an objectionable element into the weld.

It will be evident that any silicon alloy may be used as a source of silicon providing that it does not introduce an objectionable element into the weld.

ELECTRODE WIRE

The electrode wire employed in the present invention is of high purity, particularly in respect to low contents of sulphur, phosphorus, oxygen, hydrogen, and nitrogen. The electrode wire employed in the present invention has a composition by weight as follows:

| | |
|---|---|
| Carbon | 0.05 to 0.20%. |
| Sulphur | 0.01% maximum. |
| Phosphorus | 0.01% maximum. |
| Silicon | 0.3% maximum, preferably 0.1% maximum. |
| Manganese | 0.05 to 1.5%. |
| Nickel | 0 to 5%, preferably 2.5 to 5% and most desirably 2.5 to 3.5%. |
| Chromium | 0 to 2%. |
| Molybdenum | 0 to 1%. |
| Vanadium | 0 to 0.1%. |
| Columbium | 0 to 0.5%. |
| Copper | 0.5% maximum. |
| Oxygen | 100 p.p.m. and preferably 20 p.p.m. maximum. |
| Hydrogen | 10 p.p.m. and preferably 2 p.p.m. maximum. |
| Nitrogen | 100 p.p.m. and preferably 50 p.p.m. maximum. |

It will be understood that if the nickel is being put in by the flux then the nickel need not be in the electrode wire. Similarly manganese, chromium, molybdenum, columbium and vanadium could be put in by the flux or by the electrode wire. Nickel, however, in the range between 2.5 and 5% in the weld metal is essential and manganese in the range between 1.0 and 2.3% in the weld metal is essential. Also chromium in the range between 0.5 and 1.5% in the weld metal is very important. The molybdenum content in the weld metal should be in the range between 0.3 and 0.6%, which it will be understood can be obtained from the flux or from the electrode wire. Columbium and vanadium in the weld metal are optional.

The size of the electrode wire will vary according to the welding process and most often will be in a range between 1/16" and 3/16".

WELDING TECHNIQUE

It is important that the weld members be pre-heated to a temperature of between 100° and 400° F. and held at this temperature during welding. This has the effect of eliminating moisture in connection with the weld members and also reducing the likelihood of cracking in the weld.

The combination of flux and electrode should be heated to eliminate moisture prior to welding to a temperature of 500° to 1000° F. The flux combined with the electrode may be retained in a heating oven up to the time of welding and then taken immediately to the point of welding. A variation which is preferable in some cases is to remove the combined flux and electrode from the high temperature oven and place it in an oven maintained at a lower temperature, suitably in the range from 100° to 400° F., to avoid moisture absorption, taking it directly from this later oven to the point of welding. A still further variation is to hold the flux combined with the electrode in a dehumidified space, maintaining a dehumidifying condition suitably by an absorbent such as activated alumina or silica gel.

The welding can be carried out with a consumable metal arc welding technique applicable to flux coated stick electrodes or continuous electrodes. In the case of flux coated electrodes, where the flux generates $CO_2$ as a protecting gas and sufficient deoxidizer is included, the welding can be carried on in air, although optionally the welding can be carried on in a protecting gas such as carbon dioxide, argon, helium or a mixture thereof.

Where a protecting gas is used it can be introduced to a hood or chamber in which the welding is carried on or it can be applied by a snorkel or jet directly to the point of welding.

Also the short circuiting arc welding technique can be used applying flux and a protecting gas of the character just mentioned.

Depending on the welding technique the electrode can be a flux coated continuous or stick electrode. The welding can be carried on continuously or intermittently. The welding can be downhand, vertical, or overhead.

The invention can be applied with alternating current or direct current although a preferred type would be direct current reverse polarity.

Based upon experiments, welded joints have been obtained in which the yield strength was in excess of 115,000 p.s.i., in many cases in excess of 130,000 p.s.i. and in some cases in excess of 140,000 p.s.i. or even higher, and the Charpy V-notch impact resistance in excess of 20 foot-pounds at −60° F. and in excess of 30 foot-pounds at room temperature.

The weld deposit has the following analysis by weight:

| | |
|---|---|
| Carbon | 0.05 to 0.15%. |
| Sulphur | 0.01% maximum. |
| Phosphorus | 0.01% maximum. |
| Silicon | 0.6% maximum. |
| Manganese | 1.0 to 2.3%. |
| Nickel | 2.5 to 5% and preferably 2.5 to 3.5%. |
| Chromium | 0.5 to 1.5%. |
| Molybdenum | 0.3 to 0.6%. |
| Vanadium | 0 to 0.1%. |
| Columbium | 0 to 0.5%. |
| Copper | 0.5% maximum. |
| Oxygen | 400 p.p.m. maximum. |
| Hydrogen | 50 p.p.m. maximum. |
| Nitrogen | 300 p.p.m. maximum. |
| Iron | Balance. |

After welding it is very important in the process of the invention to allow hydrogen to be removed by diffusion. This is carried out by post-heating the weld in a suitable oven or in air at a temperature of 150 to 600° F. and preferably at a temperature of 200 to 300° F. If the temperature is in the higher range the recommended time of post-heating is three hours and if the temperature is 300° F. or below it is preferable to heat for at least six hours.

Joints made in 1" plates according to the invention were tested according to FIGURE 3 of Government Specification MIL–E–22200/1B.

Example 1

A flux made up as follows is used:

| | Percent |
|---|---|
| Fluorspar | 31 |
| Limestone | 41 |
| Titania | 6 |
| Extrusion agents such as bentonite | 2.5 |

| | |
|---|---|
| Ferrosilicon | 8 |
| Ferromanganese | 5 |
| Manganese metal | 2.5 |
| Ferrochromium | 2 |
| Ferromolybdenum | 2 |
| Total | 100 |

2268 grams of this dry mixture is bonded with 590 grams of water glass, made up of the following ingredients:

75% by weight of 40.5° Baumé potassium silicate having a ratio of potassium oxide to silica of 1:2.1 and
25% of 47° Baumé sodium silicate having a ratio of soda to silica of 1:2.9.

This flux is coated on an electrode, the flux comprising 30% of the total weight of the electrode wire plus flux. The flux is then baked as later described.

The electrode wire is of the following composition by weight:

| | Percent |
|---|---|
| Carbon | 0.05 |
| Sulphur | 0.007 |
| Phosphorus | 0.005 |
| Silicon | 0.01 |
| Manganese | 0.08 |
| Nickel | 2.72 |
| Chromium | 0.01 |
| Molybdenum | 0.01 |
| Copper | 0.06 |
| Iron | Balance |

The resulting weld deposit has the following composition:

| | |
|---|---|
| Carbon | 0.068%. |
| Sulphur | 0.009%. |
| Phosphorus | 0.007%. |
| Silicon | 0.46%. |
| Manganese | 1.40%. |
| Nickel | 2.55%. |
| Chromium | 0.78%. |
| Molybdenum | 0.44%. |
| Iron | Balance of metallic composition. |

The properties of the weld deposited metal as-welded in welding HP–150 steel are as follows:

| | |
|---|---|
| Yield strength p.s.i. | 137,700 |
| Tensile strength p.s.i. | 142,000 |
| Elogation in 2″ percent | 18 |
| Reduction of area do | 58 |
| Charpy V-notch impact resistance at minus 60° F. foot-pounds | 40 and 44 |
| Charpy V-notch impact resistance at room temperature foot-pounds | 58 and 55 |

The welding technique employed is as follows:
The test plates were each HP–150 1″ in thickness referred to earlier. Test plate size was 8½″ by 12″, bolted to a welding bench for higher restraint. The temperature was 200° F. pre-heat and the interpass temperature was 225° to 250° F. and the joint was aged overnight at that temperature after welding was completed and before the joint had cooled below the pre-heat temperature. The joint was prepared for welding in accordance with FIGURE 3 of the specification previously referred to. The electrodes were stick electrodes flux-coated. The welding was downhand, direct current reverse polarity circuit at 20 to 22 volts. The electrode size was 5/32″. The amperage was about 150 to 160 amperes. In this case the welding was carried on in air, the weld being protected by carbon dioxide evolved by the flux.

Example 2

Following the same procedure as above set forth, a weld was obtained having the following as-welded composition by weight:

| | |
|---|---|
| Carbon | 0.0558%. |
| Sulphur | 0.010%. |
| Phosphorus | 0.01%. |
| Silicon | .36%. |
| Manganese | 1.70%. |
| Nickel | 2.71%. |
| Chromium | .40%. |
| Molybdenum | .52%. |
| Iron | Balance of metallic ingredients. |

The properties of the weld in the as-welded form were as follows:

| | |
|---|---|
| Yield strength p.s.i. | 115,000 |
| Tensile strength p.s.i. | 124,000 |
| Elongation in 2″ percent | 21 |
| Reduction of area do | 64 |
| Charpy V-notch at room temperature foot-pounds | 72, 74, 76 |
| Charpy V-notch at minus 60° F. foot-pounds | 50, 52, 56 |

Example 3

Following the technique of Example 1, the gas contents of a sound weld in accordance with the invention were determined as follows:

| | P.p.m. |
|---|---|
| Oxygen separately determined on the same specimen | 240 and 340 |
| Hydrogen | .2 and .6 |
| Nitrogen | 70 and 90 |

Example 4

In another weld according to the invention made in this series the gas contents of the weld as-welded after post-heating in the range betwen 300° and 400° F. overnight were as follows:

| | P.p.m. |
|---|---|
| Oxygen (2 determinations) | 300 and 300 |
| Hydrogen | .3 and .4 |
| Nitrogen | 102 and 119 |

Example 5

Following the technique of Example 1, the following weld was obtained:

| | |
|---|---|
| Carbon | .14%. |
| Sulphur | .011%. |
| Phosphoruc | .009%. |
| Silicon | 0.50%. |
| Manganese | 1.54%. |
| Nickel | 2.54%. |
| Chromium | .56%. |
| Molybdenum | .43%. |
| Iron | Balance of metallic ingredients. |

The properties of the weld metal in the as welded condition were as follows:

| | |
|---|---|
| Hardness, Brinell | 350–400 |
| Assumed to correspond to a tensile strength of p.s.i. | 170,000–200,000 |
| Charpy V-notch impact resistance at room temperature foot-pounds | 58 |
| Charpy V-notch impact resistance (3 values) at −60° F. foot-pounds | 52, 53, 80 |
| Iron | Balance |

In view of my invention and disclosure variations and modifications to meet individual whim or particular need will doubtless become evident to others skilled in the art to obtain all or part of the benefits of my invention without copying the and composition process shown, and I, therefore, claim all such insofar as they fall within the reasonable spirit and scope of my claims.

Having thus described my invention, what I claim as new and desire to secure by Letters Patent is:

1. A process of producing tough welds of steel at an as-welded yield strength in excess of 115,000 p.s.i., which comprises providing a flux coating having the following composition by weight:

|   | Percent |
|---|---|
| A source of fluoride | 25–35 |
| Limestone | 25–50 |
| Titania | 2–12 |
| A source of silicon | 3–12 |
| A source of manganese | 2–15 |
| Ferrochrome | Up to 5 |
| Ferromolybdenum | Up to 3 |
| Nickel | Up to 20 |
| Ferrocolumbium | Up to 5 |
| Ferrovanadium | Up to 10 | providing an electrode wire having the following composition by weight:

|   | Percent |
|---|---|
| Carbon | 0.05–0.20 |
| Sulphur | [1] 0.01 |
| Phosphorus | [1] 0.01 |
| Silicon | [1] 0.3 |
| Manganese | 0.05–1.5 |
| Nickel | Up to 5 |
| Chromium | Up to 2 |
| Molybdenum | Up to 1 |
| Vanadium | Up to 0.1 |
| Columbium | Up to 0.1 |
| Copper | [1] 0.5 |
| Iron | Balance |

[1] Maximum.

pre-heating steel work of a yield strength level in excess of 115,000 p.s.i. to a pre-heating temperature of 100 to 400° F., baking said flux at a temperature of between 500 and 1000° F. prior to welding and protecting the flux and the electrode wire against moisture from the time of baking until the time of welding, and electric arcing between said electrode wire coated with said flux coating and said work beneath a slag formed by fusing said flux to deposit weld metal and weld said work, said weld metal containing between 2 and 5% of nickel.

2. A process of producing tough welds of steel at an as-welded yield strength in excess of 115,000 p.s.i., which comprises providing a flux coating having the following composition by weight:

|   | Percent |
|---|---|
| A source of fluoride | 25–35 |
| Limestone | 25–50 |
| Titania | 2–12 |
| A source of silicon | 3–12 |
| A source of manganese | 2–15 |
| Ferrochrome | Up to 5 |
| Ferromolybdenum | Up to 3 |
| Nickel | Up to 20 |
| Ferrocolumbium | Up to 5 |
| Ferrovanadium | Up to 10 | providing an electrode wire having the following composition by weight:

|   |   | Percent |
|---|---|---|
| Carbon | percent | 0.05–0.20 |
| Sulphur | do | [1] 0.01 |
| Phosphorus | do | [1] 0.01 |
| Silicon | do | [1] 0.3 |
| Manganese | do | 0.05–1.5 |
| Nickel | do | Up to 5 |
| Chromium | do | Up to 2 |
| Molybdenum | do | Up to 1 |
| Vanadium | do | Up to 0.1 |
| Columbium | do | Up to 0.5 |
| Copper | do | [1] 0.5 |
| Oxygen | p.p.m | [1] 100 |
| Hydrogen | p.p.m | [1] 10 |
| Nitrogen | p.p.m | [1] 100 |
| Iron |   | Balance |

[1] Maximum.

to a pre-heating temperature of 100 to 400° F., baking said flux at a temperature of between 500 and 1000° F. prior to welding and protecting the flux and the electrode wire against moisture from the time of baking to the time of welding, and electric arcing between said electrode wire coated with said flux coating and said work beneath a slag formed by fusing said flux to deposit weld metal and weld said work, said weld metal containing between 2 and 5% of nickel.

3. A process of claim 2, which further comprises additionally baking said flux immediately prior to welding at a temperature of 150 to 300° F. and thereby further protecting against hydrogen.

4. A process of claim 1, which comprises post-heating said work and said weld metal after welding at a temperature of 150 to 600° F. for a time of at least one hour.

5. A process of claim 1, in which the nickel content of the weld metal is between 2.5 and 3.5%.

6. A process of claim 1, in which said weld metal has a Charpy V-notch impact resistance in excess of 20 foot-pounds at minus 60° F. and 30 foot-pounds at room temperature.

7. A process of producing tough welds of steel having a yield strength as welded in excess of 130,000 p.s.i. and having a Charpy V-notch impact resistance in excess of 20 foot-pounds at minus 60° F., which comprises providing a flux coating having the following composition by weight:

|   | Percent |
|---|---|
| A source of fluoride | 25–35 |
| Limestone | 25–50 |
| Titania | 2–12 |
| A source of silicon | 3–12 |
| A source of manganese | 2–15 |
| Ferrochrome | Up to 5 |
| Ferromolybdenum | Up to 3 |
| Nickel | Up to 20 | providing an electrode wire having the following composition by weight:

|   |   |   |
|---|---|---|
| Carbon | percent | 0.05–0.20 |
| Sulphur | do | [1] 0.01 |
| Phosphorus | do | [1] 0.01 |
| Silicon | do | [1] 0.3 |
| Manganese | do | 0.05–1.5 |
| Nickel | do | Up to 5 |
| Chromium | do | Up to 2 |
| Molybdenum | do | Up to 1 |
| Vanadium | do | Up to 0.1 |
| Columbium | do | Up to 0.5 |
| Copper | do | [1] 0.5 |
| Oxygen | p.p.m | [1] 100 |
| Hydrogen | p.p.m | [1] 10 |
| Nitrogen | p.p.m | [1] 100 |
| Iron |   | Balance |

[1] Maximum.

preheating steel work having the following composition by weight:

|   | Percent |
|---|---|
| Carbon | 0.05–0.50 |
| Sulphur | [1] 0.01 |
| Phosphorus | [1] 0.01 |
| Silicon | [1] 0.5 |
| Manganese | 0.05–1.5 |

| | Percent |
|---|---|
| Nickel | 0.5–5 |
| Chromium | Up to 2 |
| Molybdenum | Up to 1 |
| Vanadium | Up to 0.1 |
| Columbium | Up to 0.5 |
| Copper | [1] 0.5 |
| Iron | Balance |

[1] Maximum.

to a temperature of between 100 and 400° F., baking the flux at a temperature of between 500 and 1000° F. and maintaining the flux and the electrode wire free from moisture subsequent to baking and prior to welding, electric arcing between said pre-heated work and said electrode wire coated by said flux coating to deposit weld metal having the following composition by weight:

| | | |
|---|---|---|
| Carbon | percent | 0.05–0.15 |
| Sulphur | do | [1] 0.01 |
| Phosphorus | do | [1] 0.01 |
| Silicon | do | [1] 0.3 |
| Manganese | do | 1.0–2.3 |
| Nickel | do | 2.5–5 |
| Chromium | do | 0.5–1.5 |
| Molybdenum | do | 0.3–0.6 |
| Vanadium | do | Up to 0.1 |
| Columbium | do | Up to 0.5 |
| Copper | do | [1] 0.5 |
| Oxygen | p.p.m | [1] 400 |
| Hydrogen | p.p.m | [1] 50 |
| Nitrogen | p.p.m | [1] 300 |
| Iron | | Balance |

[1] Maximum.

and post-heating said work and said weld metal at a temperature of between 150 and 600° F. to permit the hydrogen to diffuse out of the weld area until the hydrogen is less than 10 p.p.m.

8. A process of claim 7, which comprises depositing weld metal having a nickel content between 2.5 and 3.5%.

9. A process of claim 8, which comprises further baking the flux and the electrode wire immediately prior to welding at a temperature of between 150° and 300° F.

10. Flux and metallic electrode for joint use in the consumable electrode electric arc welding of steel, comprising a flux coating having the following composition by weight:

| | Percent |
|---|---|
| Fluorspar | 25–35 |
| Limestone | 25–50 |
| Titania | 2–12 |
| Ferrosilicon | 3–12 |
| Metal of the class consisting of ferromanganese and manganese | 2–15 |
| Ferrochrome | Up to 5 |
| Ferromolybdenum | Up to 3 |
| Nickel | Up to 20 |
| Ferrocolumbium | Up to 5 |
| Ferrovanadium | Up to 10 | and a metallic electrode having the following composition by weight:

| | | |
|---|---|---|
| Carbon | percent | 0.05–0.20 |
| Sulphur | do | [1] 0.01 |
| Phosphorus | do | [1] 0.01 |
| Silicon | do | [1] 0.3 |
| Manganese | do | 0.05–1.5 |
| Nickel | do | Up to 5 |
| Chromium | do | Up to 2 |
| Molybdenum | do | Up to 1 |
| Vanadium | do | Up to 0.1 |
| Columbium | do | Up to 0.5 |
| Copper | do | [1] 0.5 |
| Oxygen | p.p.m | [1] 100 |
| Hydrogen | p.p.m | [1] 10 |
| Nitrogen | p.p.m | [1] 100 |
| Iron | | Balance |

[1] Maximum.

11. Wire electrode, and flux coating, for use in combination in consumable electric arc welding processes, consisting of electrode wire having the following composition by weight, disregarding gaseous inclusion:

| | Percent |
|---|---|
| Carbon | 0.05–0.20 |
| Sulphur | [1] 0.01 |
| Phosphorus | [1] 0.01 |
| Silicon | [1] 0.3 |
| Manganese | 0.05–1.5 |
| Nickel | Up to 5 |
| Chromium | Up to 2 |
| Molybdenum | Up to 1 |
| Vanadium | Up to 0.1 |
| Columbium | Up to 0.5 |
| Copper | [1] 0.5 |
| Iron | Balance |

[1] Maximum.

and a flux coating having the following composition by weight:

| | Percent |
|---|---|
| Fluorspar | 25–35 |
| Limestone | 25–50 |
| Titania | 2–12 |
| Ferrosilicon | 3–12 |
| Metal of the class consisting of ferromanganese and manganese | 2–15 |
| Ferrochrome | Up to 5 |
| Ferromolybdenum | Up to 3 |
| Nickel | Up to 20 |
| Ferrocolumbium | Up to 5 |
| Ferrovanadium | Up to 10 |

References Cited

UNITED STATES PATENTS

| 2,879,375 | 3/1959 | Petrovich | 219—137 |
| 2,973,428 | 2/1961 | Pfeiffer et al. | 219—146 X |
| 3,177,340 | 4/1965 | Danhier | 219—146 |
| 3,195,230 | 7/1965 | Peck et al. | 219—146 X |
| 3,221,136 | 1/1965 | Freeth et al. | 219—146 |

RICHARD M. WOOD, *Primary Examiner.*

J. G. SMITH, *Assistant Examiner.*